United States Patent
Hamilton et al.

(10) Patent No.: US 6,723,376 B1
(45) Date of Patent: Apr. 20, 2004

(54) FOULING INHIBITION

(75) Inventors: Trevor Hamilton, Tyne & Wear (GB); Gergina Elizabth Green, Tyne and Wear (GB); David Neil Williams, New Castle upon Tyne (GB)

(73) Assignee: International Coatings Limited, London (GB)

( * ) Notice: Subject to any disclaimer, the term of this patent is extended or adjusted under 35 U.S.C. 154(b) by 0 days.

(21) Appl. No.: 09/599,174

(22) Filed: Jun. 22, 2000

Related U.S. Application Data

(63) Continuation of application No. PCT/GB98/03883, filed on Dec. 23, 1998.

(30) Foreign Application Priority Data

Dec. 23, 1997 (GB) ............................................. 9727261

(51) Int. Cl.⁷ ................................................. B05D 5/00
(52) U.S. Cl. ........................ 427/142; 427/140; 427/301; 427/302; 427/407.1; 427/409; 427/419.7
(58) Field of Search ................................ 427/399, 400, 427/301, 302, 419.7, 140, 142, 409, 407.1

(56) References Cited

U.S. PATENT DOCUMENTS

| | | | |
|---|---|---|---|
| 3,702,778 A | 11/1972 | Mueller et al. ................ | 117/75 |
| 4,133,938 A | * 1/1979 | Bingham .................... | 427/302 |
| 4,431,472 A | 2/1984 | Hohl et al. .............. | 156/307.3 |
| 4,637,958 A | 1/1987 | Wegehaupt et al. ......... | 428/416 |
| 5,902,851 A | * 5/1999 | Yamaki et al. ............... | 524/506 |
| 5,904,988 A | 5/1999 | Stein et al. ................. | 428/447 |
| 5,985,012 A | * 11/1999 | Nakamura et al. ....... | 106/15.05 |
| 6,180,249 B1 | * 1/2001 | Stein .......................... | 427/387 |

FOREIGN PATENT DOCUMENTS

| | | | |
|---|---|---|---|
| EP | 0 032 597 | 7/1981 | ............ C09D/5/16 |
| GB | 1 307 001 | 2/1973 | ............ B44D/5/08 |
| GB | 1 470 465 | 4/1977 | ............ B05D/5/08 |
| GB | 1 571 199 | 7/1980 | ............ B05D/5/00 |
| GB | 1 581 727 | 12/1980 | ............ B05D/5/00 |
| GB | 2 188 938 | 10/1987 | ............ C09D/5/14 |
| GB | 2 192 400 | 1/1988 | ............ C09D/5/14 |
| WO | 93/13179 | 7/1993 | ......... C09D/143/04 |

OTHER PUBLICATIONS

International Search Report, PCT/GB 98/03883, dated Apr. 26, 1999.

* cited by examiner

*Primary Examiner*—Shrive P. Beck
*Assistant Examiner*—Kirsten Crockford Jolley
(74) *Attorney, Agent, or Firm*—Lainie E. Parker; Joan M. McGillycuddy

(57) ABSTRACT

A process for inhibiting the fouling of a substrate in a fouling environment, which comprises forming on the substrate, before exposure to the environment, a coating comprising a film-forming polymer (A) carrying unreacted curable silicon-containing functional groups providing latent reactivity, and thereafter applying a layer comprising a curable polymeric fouling-inhibiting material (B), more especially a curable polysiloxane or a curable flourine-containing polymer, and bonding the applied layer to the coating by a condensation curing reaction involving the unreacted functional groups thereon. The initial coating can be applied over a range of worn or damaged anti-fouling coatings. The sequential application of layers is a simpler, more flexible and more controllable procedure than is offered by complex systems designed to produce outer siloxane-rich regions. Relatively long periods are achievable.

36 Claims, No Drawings

FOULING INHIBITION

The present invention is a continuation International Patent Application No. PCT/GB98/03883, filed on Dec. 23, 1998 and claimed priority of Great Britain Application No. 9727261.1, filed on Dec. 23, 1997.

FIELD OF INVENTION

This invention relates to a process for inhibiting fouling of a substrate in a fouling environment, more especially a marine or other aquatic environment.

BACKGROUND OF THE INVENTION

Man-made structures such as boat hulls, buoys, drilling platforms, oil production rigs and pipes which are immersed in water are prone to fouling by aquatic organisms such as green and brown algae, barnacles, mussels and the like. Marine structures are commonly of metal, but may also comprise other structural materials such as concrete. For smaller boats, the hulls may instead comprise, for example, wood or a fibre-reinforced resin. This fouling is a nuisance on boat hulls, because it increases the frictional resistance towards movement through the water, with the consequence of reduced speeds and increased fuel costs. It is a nuisance on static structures such as the legs of drilling platforms and oil production rigs, firstly because the resistance of thick layers of fouling co waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence of reduced flow rates.

The commercially most successful methods of inhibiting fouling have involved the use of anti-fouling coatings containing substances toxic to aquatic life, for example tributyltin chloride or cuprous oxide. Such coatings, however, are being regarded with increasing disfavour because of the damaging effects such toxins can have if released into the aquatic environment. There is accordingly a need for non-fouling coatings which do not contain markedly toxic materials.

It has been known for many years, for example, as disclosed in GB 1 307 001 and U.S. Pat. No. 3,702,778 that silicone rubber coatings resist fouling by aquatic organisms. It is believed that such coatings present a surface to which the organisms cannot easily adhere, and they can accordingly be called non-fouling rather than anti-fouling coatings. Silicone rubbers and silicone compounds generally have very low toxic properties. Silicone rubber coatings have, however, gained little commercial acceptance. It is difficult to make them adhere well to the substrate surface that is to be protected, and they are mechanically rather weak and liable to damage.

EP 0 032 597. discloses that silicone polymers onto which organic polymeric segments are grafted may be is vulcanised to form non-fouling coatings. The vulcanisation procedure may utilise a crosslinking agent such as tetraethyl orthosilicate and a catalyst such as a tin salt.

GB 2 188 938 discloses that vinylic polymers containing polymeric silicone side chains may be used to form thermoplastic non-fouling coatings.

GB Patent Application 2 192 400 discloses anti-fouling paint compositions which comprise a vinylic copolymer obtained by copolymerisation of:

(a) 1–50% by weight of a polymerisable unsaturated polysiloxane compound;
(b) 0–30% by weight of a polymerisable unsaturated alkoxysilane compound; and
(c) 20–99% by weight of a polymerisable unsaturated vinyl monomer other than (a) or (b).

The disclosed anti-fouling paint compositions may also comprise a hydroxyalkyl-tipped poly(diorganosiloxane) to the extent of 1–50 parts by weight per 100 parts by weight of the vinylic copolymer. The vinylic copolymer and the poly(diorganosiloxane) are not curable one with the other, and the coatings disclosed in GB-A-2 192 400 are thermoplastic and not vulcanised.

Coatings which contain a chemically inert oil or grease, often called a slipping agent, have been reported to offer improved resistance to fouling. GB 1 470 465 discloses the use of silicone oils as slipping agents in a vulcanised silicone rubber formulation. GB 1 581 727 discloses the use of silicone-free organic compounds, for example polyolefins with a molecular weight up to about 5000, as slipping agents in a vulcanised silicone rubber formulation.

WO 93/13179 discloses a composition for fouling inhibition which comprises (A) a functional-group containing polymer having no more than a minor proportion of siloxane repeating units and (B) a polysiloxane which is curable with the polymer (A). After application of the composition to a substrate and curing, the innermost region of the resulting coating generally comprises no more than a minor proportion of siloxane material whereas the coating presents a siloxane-rich surface layer to the external environment. As a result, the coating provides fouling inhibition properties whilst at the same time the problems of mechanical weakness of previously proposed silicone rubber coatings are alleviated or avoided.

SUMMARY OF THE INVENTION

The present invention provides a process for inhibiting the fouling of a substrate in a fouling environment, which comprises forming on the substrate, before exposure to the environment, a coating comprising a film-forming polymer (A) carrying unreacted silicon-containing functional groups providing latent reactivity, and thereafter applying a layer comprising a curable polymeric fouling-inhibiting material (B) and bonding the applied layer to the coating by a condensation curing reaction involving the unreacted functional groups thereon.

The invention further provides a substrate bearing a coating which has been applied by the process, i.e., having an outer layer comprising cured component (B).

An especially important aspect of the present invention comprises inhibition of fouling of structures in aquatic and, in particular, marine environments, especially the hulls of boats and ships of all sizes.

The curable polymeric fouling-inhibiting material (B) carries functional groups capable of condensation curing with the unreacted silicon-containing functional groups on the initial coating comprising the film-forming polymer (A). The material (B) advantageously comprises a curable polysiloxane, but other curable polymeric materials, especially fluorine-containing polymers, for example, fluoroacrylate polymers may be used.

DETAILED DESCRIPTION OF THE INVENTION

The invention is described hereinafter with particular reference to the preferred case in which the material (B)

comprises a curable polysiloxane, but it will be appreciated that similar considerations apply in the case of other materials. Thus, in broad concept, the invention comprises the provision of an initial coating which, after application, carries unreacted silicon-containing functional groups which provide latent reactivity for subsequent curing with the curable polymeric fouling-inhibiting material (B).

The condensation curing reaction between the silicon-containing functional groups on the initial coating and a curable polysiloxane may proceed, for example, as follows:

(i) $\equiv$Si—OH+HO—Si$\equiv$ → $\equiv$Si—O—Si$\equiv$+$H_2O$
(ii) $\equiv$Si—OCH$_3$+HO—Si$\equiv$ → $\equiv$Si—O—Si$\equiv$+$CH_3OH$
(iii) $\equiv$Si—H+HO—SI$\equiv$ → $\equiv$Si—O—SI$\equiv$+$H_2$
(iv) $\equiv$Si—O—NR$_a$—R$_b$+HO—Si$\equiv$ → $\equiv$Si—O—Si$\equiv$+R$_a$—R$_b$NOH
(v) $\equiv$Si—NR$_c$R$_d$+HO—Si$\equiv$ → $\equiv$Si—O—Si$\equiv$+R$_c$R$_d$NH (vi)

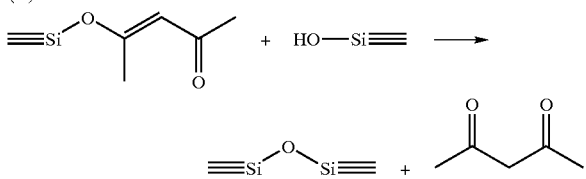

(vii) $\equiv$Si—O—NCR'R$^2$+HO—Si$\equiv$ → $\equiv$Si—O—Si$\equiv$+R'R$^2$CNOH, which may hydrolyse to an aldehyde or ketone, R'R$^2$CO and hydroxylamine, $NH_2OH$, under the conditions of the condensation.

The film-forming polymer (A) may comprise pendant and/or terminal curable functional groups. Pendant curable functionality is preferred, for example, in the case where the polymer is derived from one or more ethylenically unsaturated monomers, and terminal curable functionality is preferred, for example, if the polymer (A) is polyurethane, epoxy or polyester based.

The silicon-containing curable groups may be mono-, di- or tri-functional. In the case of di- or tri-functional groups, it is in general not necessary to provide a separate cross-linking agent for the curing reaction with the polysiloxane (B).

Advantageously, the curable silicon-containing groups are curable by virtue of one or more curable functional groups selected from aliphatic, aromatic and araliphatic ether (for example, methoxy) and oxime groups. Although the silicon-containing functional groups can in principle be curable by virtue of ester groups, there may be difficulties in obtaining the desired period of latency in the case of ester groups comprising relatively short-chain hydrocarbon moieties (say, up to $C_3$ or $C_4$). Mention may also be made of silicon-containing functional groups which are curable by virtue of groups other than epoxy groups.

Preferably, the curable silicon-containing functional groups are groups of the formula

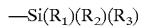

in which the groups represented by $R_1$, $R_2$ and $R_3$ may be the same or different and each may comprise an ether or ester group, preferably a group including a straight-chain or branched alkyl moiety having from 1 to 4 carbon atoms, and in which one or two of $R_1$ to $R_3$ may represent hydrogen or a hydrocarbon group, preferably a straight-chain or branched alkyl group having from 1 to 4 carbon atoms.

Examples of preferred silicon-containing functional groups are trimethoxy silyl and methyl dimethoxysilyl.

Other preferred silicon-containing functional groups comprise one or more oxime groups of the formula

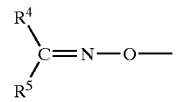

in which $R^4$ and $R^5$ may be the same or different and each represents a straight-chain or branched, saturated or unsaturated, aliphatic hydrocarbon radical, preferably having up to 7 carbon atoms, more especially up to 4 carbon atoms, especially a methyl or ethyl group; an aromatic group, for example, a phenyl group; or an araliphatic group, for example, a benzyl group; or $R^4$ and $R^5$ together represent an alkylene group; or one of $R^4$ and $R^5$ represents hydrogen. Preferably each of $R^4$ and $R^5$ is other than an aromatic group. A group $R^4$ and/or $R^5$ may be substituted or unsubstituted.

Preferably, the silicon-containing functional groups do not contain any amine functionality, and preferably also no silanol functionality; each of those functionalities tends to detract from the desired latent reactivity.

Preferably, the film-forming polymer does not contain any functional groups apart from those conferring the desired latent reactivity. If any other functional groups are present, care must be taken to ensure that such additional groups do not detract from the desired latent reactivity. Examples of functional groups which may interfere in this way are acid functionalities and amine (including imine) and other base functionalities. Such interfering groups should be avoided both in the film-forming polymer and in the coating formulation used to apply the polymer.

Preferably, pendant curable silicon-containing functional groups in (A) are connected to the polymer by a chemical linkage that is resistant to aqueous hydrolysis in natural waters; sea water, for example, has pH 8.0–8.3. The silicon-containing bonds which are capable of undergoing condensation curing as described above, for example silyl ether and silyl ester, are therefore generally unsuitable for the purpose of attaching silicon-containing groups to the polymer backbone. It is preferred that the chemical linkage should contain silicon directly linked to carbon. For example, the chemical linkage may comprise an alkylene group $C_nH_{2n}$ where n is a non-zero integer preferably having the value 1–5, an alkylidene group, or an arylene group, for example phenylene, or may be a direct chemical bond to a carbon atom in the polymer backbone.

The film-forming polymer may be derived from one or more ethylenically unsaturated monomers, more especially from one or more ethylenically unsaturated monomers selected from unsaturated aliphatic hydrocarbons, for example, ethylene, propylene and butylene; unsaturated halogenated hydrocarbons, for example, vinyl chloride, vinyl fluoride, vinylidene chloride and vinylidene fluoride; vinyl aromatic compounds, for example, vinyl pyridine, vinylnaphthalene, and styrene (including ring-substituted styrenes); unsaturated esters, amides and nitrites; and N-vinyl compounds, for example, N-vinyl pyrrolidone, N-vinyl carbazole and N-vinyl caprolactam. Mention should also be made of polyvinylacetate and polyvinylalcohol.

As further possibilities, the film-forming polymer may comprise repeating units derived from urethanes, ureas, urethane-ureas, amides, imides, amide-imides, epoxy compounds, and esters. Mention should also be made of alkyl resins and polyethers.

As particular examples of olefinic monomers may be mentioned such compounds as acrylic and methacrylic esters, amides and nitrile derivatives, styrene and vinyl chloride. Acrylate and methacrylate esters are preferred monomers, especially those derived from saturated alcohols containing 4–16 carbon atoms, such as the butyl, hexyl, octyl, decyl, dodecyl and hexadecyl esters. Mention should also be made of isobornyl acrylate and isobornyl methacrylate.

Advantageously, the polymer of (A) is derived from one or more monomers (A1) which carry curable silicon-containing groups and one or more monomers (A2) which do not carry such groups. In the case of monomer(s) (A1) carrying pendant curable silicon-containing groups, the molar proportion of monomer(s) (A1) to that of monomer(s) (A2) may be in the range of from 5% to 25%, typically at least 8% or 12% and usually not exceeding 20%. The preferred range is dependent principally on the nature of the latent functional groups, the latency period desired, and the nature of the polymer backbone.

Polymers (A) carrying curable silicon-containing groups may expediently be manufactured by the polymerisation of one or more monomers containing such groups, advantageously with one or more comonomers which do not contain such groups. For example, such silicon-containing monomers may be derivatives of compounds such as acrylic acid, methacrylic acid, styrene, or ethylene. Examples of derivatives of acrylic and methacrylic acid are the esters in which the esterifying group includes the silicon-containing group. As particular examples of such derivatives there may be mentioned 3-(trimethoxysilyl)propyl acrylate and methacrylate (I) and 3-(dimethyl(trimethoxysilyloxy)silyl)propyl acrylate and methacrylate (II) (Me represents ≡methyl).

$CH_2$=$CRCO_2(CH_2)_3Si(OMe)_3$ (I) R represents H or $CH_3$ $CH_2$=$CRCO_2(CH_2)_3SiMe_2OSi(OMe)_3$ (II) R represents H or $CH_3$ Compound I(R represents $CH_3$) is particularly preferred ("TMSPM").

Examples of derivatives of styrene as monomers (A1) are those in which a benzene ring is substituted both with a vinyl or 2-propenyl group and with a silicon-containing group. As particular examples of styrene derivatives there may be mentioned the isomeric trimethoxysilylstyrenes and the isomeric 2-(trimethoxysilylethyl)styrenes. As examples of derivatives of ethylene as monomers (A1) may be mentioned trimethoxyvinylsilane and triethoxyvinylsilane.

Instead of using monomers (A1) which already carry curable silicon-containing groups, it is possible (but less preferred) to graft such groups, for example trimethoxysilyl groups, onto a preformed polymer carrying suitable reactive sites at which the curable silicon-containing groups can be attached.

Thus, for example, trimethoxysilyl and methyl dimethoxysilyl functional groups may be incorporated by reaction of the corresponding mercaptopropyl silane with epoxy groups.

It may also be advantageous to utilise two or more different comonomers not containing a curable silicon group, for example a $C_{1-4}$ alkyl acrylate or methacrylate ester together with a $C_{6-16}$ acrylic or methacrylic ester. Thus, for example, in another preferred embodiment, polymer (A) is derived from the following monomers in the following molar proportions:

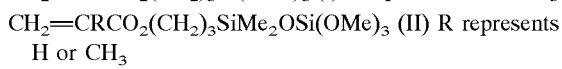

| TMSPM | | 10% |
|---|---|---|
| Lauryl or butyl acrylate | 20%) | |
| | ) | 90% |
| Methyl methacrylate | 70%) | |

The following general considerations are relevant in determining a suitable composition for the film-forming polymer having unreacted functional groups conferring latent reactivity:

i) Increasing the content of functional groups will generally increase the cost of the polymer material and will tend to decrease its storage stability, but tends to increase the period of latency when the polymer material has been applied to the substrate.

ii) The Tg of the polymer should be above room temperature and, in general, increasing Tg will lead to improved barrier performance of the coating and to an extended period of latency. It may be noted, however, that if the Tg is too high there may be interference with the subsequent curing reaction with the polysiloxane or other curable material (B), although the effect of this can in principle be reduced by increasing the content of silicon-containing functional groups. It will be appreciated that the Tg of the polymer can be varied by suitable choice of monomers and monomer proportions.

iii) The preferred minimum content of silicon-containing functional groups in the polymer (A) in the initial coating formulation will depend, inter alia, on the reactivity of the groups concerned. Thus, for example, trimethoxysilyl groups will tend to be more reactive than methyl dimethoxysilyl groups, and each will tend to be more reactive than the corresponding propoxy groups (which will normally be isoropoxy groups). Although the film-forming polymer may include a proportion of siloxane repeating units, advantageously at least a major proportion of the repeating units, and preferably at least 55% of the units, are other than siloxane units. The proportion of siloxane repeating units is advantageously not more than 25%, preferably not more than 10%, and more especially not more than 5%. In a preferred form of the composition, the polymer of component (A) is substantially free of siloxane repeating units.

The film-forming polymer may have a number-average molecular weight in the range of from 1 000 to 50 000, preferably up to 15 000, more especially from 3000 to 10 000.

If appropriate, a chain transfer agent may be used in the production of the film-forming polymer (A). As examples of chain transfer agents there may be mentioned 1-dodecanethiol and mercapto-propyltrimethoxysilane. The molecular weight of the polymer may also be controlled by varying the content of polymerisation initiator. Examples of preferred free-radical initiators include organic peroxides such as tert-butyl peroxy-2-ethylhexanoate (available under the trade name Trigonox 215) and the materials available under the trade names Trigonox 27 and Trigonox 41-C 75.

It will be appreciated, from the requirement for the initial coating to have unreacted functional groups providing latent reactivity, that the initial coating formulation should not include any cross-linking agent or curing catalyst, nor indeed any other material which may detract unduly from the desired latency (For example, acids, bases, organic metal salts, water or other protic solvents). The initial coating should be formulated so as to behave generally as a thermoplastic material during the period of latency, with only a minimum of self-curing taking place. The initial film formation takes place by solvent evaporation rather than by a curing reaction.

The practical minimum period of latency will depend in turn on the desired or necessary minimum interval between application of the initial coating and subsequent application of the curable polysiloxane. In general it is considered that a minimum latency period of 2 hours under the prevailing conditions will be needed, but there will be circumstances requiring a minimum of 12, 24 or 48 hours, a week, a month or even longer. Factors influencing the latency period have been outlined hereinbefore.

The latency period for any given coating can be determined using a standard overcoating test under specified conditions of temperature and humidity. Test portions of the curable polysiloxane material are applied at a series of different time intervals to different test areas of an initially coated substrate and cured onto the initial coating. The latency period is identified as the maximum time interval (after application of the initial layer) at which satisfactory adhesion of the coating (B) is still achieved.

In practical operation, the coating (B) can be applied at any time before expiry of the latency period for the initial coating used.

Each curable polysiloxane applied according to the invention as material (B) to the initial coating having latent reactivity may be an organohydrogen-polysiloxane or a polydiorganosiloxane. The polysiloxane may, for example, comprises a copolymer of diorganosiloxane units with organohydrogen siloxane units and/or with other diorganosiloxane units, or a homopolymer of organohydrogen siloxane units or of diorganosiloxane units.

Mention may also be made of polysiloxanes which comprise one or more other co-monomers in addition to siloxane repeating units. Such polysiloxanes may be derived from siloxane units and one or more ethylenically unsaturated monomers, more especially one or more ethylenically unsaturated monomers selected from unsaturated aliphatic hydrocarbons, for example, ethylene, propylene and butylene; unsaturated halogenated hydrocarbons, for example, vinyl chloride, vinyl fluoride, vinylidene chloride and vinylidene fluoride; vinyl aromatic compounds, for example, vinyl pyridine, and vinylnaphthalene; unsaturated esters, amides and nitriles; and N-vinyl compounds, for example, N-vinyl pyrrolidone, N-vinyl carbazole and N-vinyl caprolactam. Mention should also be made of polyvinylacetate and polyvinylalcohol.

As further possibilities, a polysiloxane copolymer may include repeating units derived from urethanes, ureas, urethane-ureas, amides, imides, amide-imides, epoxy compounds, and esters. Mention should also be made of alkyl resins and polyethers.

As particular examples of olefinic co-monomers may be mentioned such compounds as acrylic and methacrylic esters, amides and nitrile derivatives, and vinyl chloride. Acrylate and methacrylate esters may, for example, be derived from saturated alcohols containing 4–16 carbon atoms, such as the butyl, hexyl, octyl, decyl, dodecyl and hexadecyl esters. Mention should also be made of isobornyl acrylate and isobornyl methacrylate.

Advantageously, in a polysiloxane copolymer, at least 55% of the repeating units are siloxane repeating units. The proportion of siloxane repeating units is preferably at least 75%, especially at least 90%, and more especially at least 95%.

Mention may also be made of coatings (B) which are derived from polysiloxanes in admixture or conjunction with one or more organic polymeric materials. The polysiloxane content of such mixtures or combinations is advantageously at least 75% by weight, preferably at least 90% by weight and especially at least 95% by weight.

The other material(s) used in such mixtures or combinations may themselves carry functional groups which are curable with the unreacted silicon-containing functional groups on the initial coating, or may carry no such groups. In the case in which the other material(s) carry curable functional groups, those groups may be the same as those on the polysiloxane (which may itself comprise a mixture or combination of two or more poly-siloxane materials, at least one of which is curable with the initial coating) or different functional groups may be employed.

The other material(s) used in admixture or conjunction with the polysiloxane(s) may themselves have fouling-inhibiting properties, but need not do so provided that the total coating (B) has such properties. Mention may be made in this connection of coatings (B) which are derived from polysiloxanes in admixture or conjunction with one or more fluorine-containing polymers.

Other polymeric fouling-inhibiting materials, especially fluorine-containing polymers, may also comprise copolymers or polymer mixtures or combinations, and the discussion above relating to polysiloxane systems is then applicable mutatis mutandis.

Subject to curability with the unreacted silicon-containing functional groups of the initial coating, the curable polysiloxane(s) or other material (B) may in principle contain any of the functional groups, which may be pendant and/or terminal, described above in connection with the initial coating as susceptible to condensation curing. Interference with latency is no longer a consideration, however, so that, for example, there are not the same disadvantages arising from the presence of silanol groups, and the polysiloxane or other material (B) is advantageously curable by virtue of such groups. Additionally or alternatively, the polysiloxane or other material (B) may be curable by virtue of silanol or silica-alkoxy groups or, curable functional groups selected from aliphatic, aromatic and aralphatic ether, ester and oxime groups, which may be substituted or unsubstituted, or also trialkoxysilyl or hydrosilyl groups. A curable ether group may be, for example, an alkoxy group such as, for instance, methoxy or ethoxy. An example of a curable ester group is acetoxy.

Thus, by way of preferred example, a curable polysiloxane may be curable by virtue of oxime groups of the formula

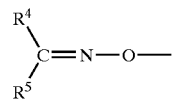

in which $R^4$ and $R^5$ may be the same or different and each represents a straight-chain or branched, saturated or unsaturated, aliphatic hydrocarbon radical, preferably having up to 7 carbon atoms, more especially up to 4 carbon atoms, especially a methyl or ethyl group; an aromatic group, for example, a phenyl group; or an aralphatic group, for example, a benzyl group, or $R^4$ and $R^5$ together represent an alkylene group, or one of $R^4$ and $R^5$ represents hydrogen. A group $R^4$ and/or $R^5$ may be substituted or unsubstituted.

Oxime-functional polysiloxanes maybe prepared by reaction of the corresponding hydroxy-functional siloxane with a ketiminoxysilane, for example, methyl tris (methylethylketiminoxy)silane, or one or more of the following ketiminoxysilanes:

$CH_3Si[ON=C(CH_3)_2]_3$, $CH_3Si[ON=C(CH_3)C_2H_5]_3$,
$(CH_2=CH)Si[ON=C(CH_3)C_2H_5]_3$, $C_6H_5Si[ON=C(CH_3)_2]_3$,
$CH_3Si[ON=C(C_2H_5)(CH_2)_3CH_3]_3$,
$(CH_3)_2C=NOSi[ON=C(CH_3)C_2H_5)_3$

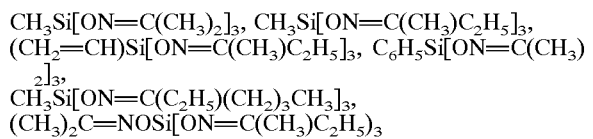

$Si[ON=C(C_2H_5)(CH_3)]_4$ or $Si[ON=C(CH_3)_2]_4$.

Preferred polysiloxanes are linear polymers and advantageously have the structure $R^3O(SiR^1R^2O)_nR^3$, in which $R^1$ and $R^2$, which may be the same or different on each silicon atom and on different silicon atoms in the polymer, each represents an alkyl group such as, for example, methyl, ethyl, or propyl; an alkenyl group such as, for example, vinyl or allyl; a cycloalkyl or cycloalkenyl group; an aryl group such as, for example, phenyl; or a halogenated or cyano-substituted hydrocarbon group, with the proviso that one of $R^1$ and $R^2$ may represent hydrogen on some or all of the silicon atoms and that $R^1$ and $R^2$ may each represent hydrogen on some of the silicon atoms, $OR^3$ represents a curable functional group in which $R^3$ represents a monovalent radical such as, for example, hydrogen, alkyl, aryl or $R^4R^5CN$ where $R^4$ and $R^5$ are as hereinbefore defined, and n represents a degree of polymerisation. Preferably $R^1$ and $R^2$ are each methyl, although partial or total replacement of $R^2$ by phenyl may be of advantage.

It is generally advantageous for at least some and preferably all curable functional groups in a polysiloxane material (B) to be bonded directly to silicon.

The polysiloxane or other material (B) may have a number-average molecular weight in the range of from 500, 1 000 or 1 500 to 310 000, generally from 1 800 to 80 000 or 85 000. Preferably, the number-average molecular weight is at least 5 000, advan- tageously at least 10 000, and more especially at least 15 000. The upper limit of molecular weight will usually be 60 000 or 70 000.

The polysiloxane or other material (B) preferably has a viscosity in the range of from 7.5 to 200 poise at 25° C. By way of illustration, it will in general be desirable to utilise a hydroxy-functional polysiloxane having a viscosity towards the upper end of the range, whereas for an oxime-functional polysiloxane it will in general be desirable to utilise a material having a viscosity towards the lower end of the range.

Advantageously, a curing catalyst, optionally in conjunction with a co-catalyst, is used to promote the reaction of the curable polysiloxane or other material (B) with the unreacted functional groups on the initial coating. Examples of catalysts which may be used include the carboxylic acid salts of various metals, for example, tin, zinc, iron, lead, barium and zirconium. The salts are preferably salts of long-chain carboxylic acids, for example, dibutyltin dilaurate, dibutyltin dioctoate, iron stearate, tin (II) octoate and lead octoate. Further examples of suitable catalysts include organobismuth and organotitanium compounds and organo-phosphates such as bis(2-ethyl hexyl) hydrogen phosphate.

Other possible catalysts include chelates such as, for example, dibutyltin acetoacetonate.

As a further possibility, the catalyst may comprise a halogenated organic acid, which has at least one halogen substituent on a carbon atom which is in α-position relative to the acid group, and/or at least one halogen substituent on a carbon atom which is in β-position relative to the acid group, or a derivative which is hydrolysable to form such an acid under the conditions of the condensation reaction.

Where appropriate in the following description, references to the acid catalyst include references to hydrolysable derivatives thereof.

The acid catalyst may be a mono-, di- or polybasic acid, but is preferably a monobasic acid.

The acid catalyst is a protonic acid and may comprise one or more carboxylic and/or sulphonic acid groups, preferably one or more carboxylic acid groups.

Each halogen substituent may be fluorine, chlorine or bromine, but is preferably chlorine.

Advantageously, on an α- and/or a β-carbon atom of the acid catalyst, there are one or two fluorine substituents, from one to three chlorine substituents, or three bromine substituents. Thus, for example, the acid catalyst may comprise dichloroacetic acid, trichloroacetic acid or tribromoacetic acid.

The acid is advantageously an aliphatic acid, but may comprise one or more aromatic groups, such as phenyl or substituted phenyl, provided that there is preferably no aromatic group attached to the α-carbon atom or bonded directly to the acid group. An aromatic group may be a heterocyclic group, such as pyridyl or pyrrolyl. An aliphatic acid may be a cyclic or, preferably, an acyclic acid.

Advantageously, the catalyst is a halogenated alkanoic acid having up to 5 carbon atoms or a hydroxy-substituted derivative of such an acid.

As examples of acid derivatives which are hydrolysable to form the acids under the conditions of the condensation reaction there may be mentioned anhydrides, for instance, trichloroacetic acid anhydride, and esters, which may be hydrocarbyl esters, especially methyl esters, or alkyl silyl esters, advantageously $C_{1-4}$ alkylsilyl esters, especially methylsilyl esters. Thus, for example, the catalyst may comprise trimethylsilyl-trichloroacetate.

If the catalyst contains more than one acid group, there may be halogen substitution on each α- and/or β-carbon atom or on only some of those carbon atoms.

The acid catalyst may carry one or more other substituents in addition to the specified halogen substitution.

The acid catalyst may be used alone or in conjunction with one or more other such catalysts but in the absence of any metal salt catalyst of the kind previously proposed. In particular, acid catalysts of the invention offer the possibility of dispensing with tin-based catalysts such as dibutyltindilaurate.

The proportion of catalyst may be in the range of from 0.01 to 5% by weight, based on the amount of polymer (B), preferably at least 0.05% by weight and advantageously not exceeding 2% by weight.

It may be necessary or desirable to use a cross-linking agent for the curing reaction.

Advantageously, a cross-linking agent comprises a functional silane, more especially a functional silane of the formula

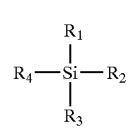

(I)

in which the groups represented by $R^1$ to $R^4$ may be the same or different and, subject to there being at least di-functionality, each may comprise a straight-chain or branched, saturated or unsaturated, aliphatic hydrocarbon radical, preferably having up to 7 carbon atoms, more especially up to 4 carbon atoms, or an aromatic or araliphatic hydrocarbon radical, such as, for example, phenyl or benzyl, or an aliphatic or aromatic Other group, such as an alkoxy, phenoxy or benzyloxy group, or an ester group. An aliphatic group $R^1$ to $R^4$ is preferably an alkyl group, advantageously a $C_1$–$C_4$ alkyl group, preferably a methyl or ethyl group, and an alkoxy group $R^1$ to $R^4$ is advantageously $C_1$–$C_4$ alkoxy, preferably methoxy or ethoxy. Preferred examples of alkoxysilanes of the formula (I) include tetraalkyl orthosilicates such as tetramethyl, -ethyl, -propyl or -butyl orthosilicate, dimethoxydimethyl silane and diethoxydimethyl silane. It will be appreciated that, in order to serve as a cross-linking agent, a compound of formula (I) must be at least difunctional and preferably at least tri-functional. Any of the groups $R^1$ to $R^4$ in formula (I) may be unsubstituted or may be substituted by one or more substituents selected, for example, from halogen (especially chlorine or fluorine), amino groups or alkyl groups, which may themselves be substituted or unsubstituted.

Alternatively, a functional silane cross-linking agent may be reactive by virtue of one or more oxime groups of the formula

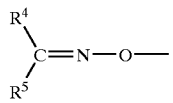

in which $R^4$ and $R^5$ may be the same or different and each represents a straight-chain or branched saturated or unsaturated, aliphatic hydrocarbon radical, preferably having up to 7 carbon atoms, more especially up to 4 carbon atoms, especially a methyl or ethyl group; an aromatic group, for example, a phenyl group; or an araliphatic group, for example, a benzyl group, or $R^4$ and $R^5$ together represent an alkylene group, or one of $R^4$ and $R^5$ represents hydrogen. A group $R^4$ and/or $R^5$ may be substituted or unsubstituted.

Thus, the functional silane may be a ketiminoxysilane, for example, methyl tris(methylethylketiminoxy)silane, or one or more of the following ketiminoxy silanes:

$CH_3Si[ON=C(CH_3)_2]_3$, $CH_3Si[ON=C(CH_3)C_2H_5]_3$,
$(CH_2=CH)Si[ON=C(CH_3)C_2H_5]_3$, $C_6H_5Si[ON=C(CH_3)_2]_3$,
$CH_3Si[ON=C(C_2H_5)(CH_2)_3CH_3]_3$,
$(CH_3)_2C=NOSi[ON=C(CH_3)C_2H_5)_3$

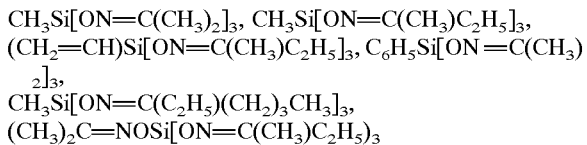

$Si[ON=C(C_2H_5)(CH_3)]_4$ or $Si[ON=C(CH_3)_2]_4$.

Other possible cross-linking or curing agents include oximes such as vinyltris(methylethylketoxime) or methyltris(methylethylketoxime).

As a further possibility, more particularly when organometallic catalysts are used, especially tin-based catalysts, a cross-linking or curing agent may comprise a cyclic compound of the following formula:

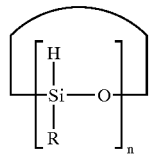

in which n is an integer of from 3 to 10, and R represents hydrogen or methyl. Such materials are less preferred, however, because of the possibility of foaming arising from hydrogen evolution on curing.

A silane cross-linking agent may in principle be incorporated in a monomeric form or in the form of a self-condensation product, which may be, for example, a dimer, trimer, heptamer or a low molecular weight polymer.

The proportion of cross-linking agent may be in the range of from 0.05 to 10% by weight, generally from 2 to 5% by weight, based on the amount of polymer (B).

The process for forming the initial coating and for applying the subsequent layer of curable polysiloxane or other material (B) is most conveniently carried out using a solution of the corresponding material in a non-reacting volatile solvent. Suitable solvents include aromatic hydro-carbons, for example toluene, xylene and trimethylbenzene; alcohols, for example, butanol; ketones, for example 4-methylpentan-2-one (methylisobutylketone), 5-methylhexan-2-one (methylisoamylketone) and cyclohexanone; esters, for example butyl acetate and 2-ethoxyethyl acetate, and mixtures of the above with one another or with an aliphatic hydrocarbon, for example in the form of white spirit. Such solutions can be applied to the surface to be coated by any of the known methods such as brush-painting, roller-painting, spray-painting and using aerosol formulations. In order to minimise the use of solvent on both cost and environmental grounds, it is advantageous to use as concentrated a solution as possible which is compatible with the coating technique employed. A solution of the coating composition comprising components (A) or (B), as the case may be, may comprise at least 35% by weight solids, generally at least 50% by weight solids. More concentrated solutions, for example containing at least 70% solids, may be employed if the polymer component (A) is of low molecular weight. In principle, the maximum solids content may be as high as 90% by weight or even more, but in general the maximum practicable solids content will be in the range 75–85% by weight, typically 80% by weight.

The presence of water is in general required in order to achieve full cure in the process of the invention, but specific addition of water is not normally required, either during or after application of the polysiloxane. It will in general be found that atmospheric moisture is sufficient to induce curing, and it will not normally be necessary or appropriate to heat the applied polysiloxane for curing purposes.

It is preferable to take steps to minimise the water content of all ingredients of the initial coating formulation and also the polysiloxane formulation, and it will be appreciated that no water or aqueous material should be added. Thus, for example, commercially available solvents will frequently contain a small amount of water (say, 1–2% by volume) and it is preferable to reduce the water content of such materials before use. In principle, such reduction in water content may be achieved by distillation in conjunction with a drying agent such as, for example, sodium, sodium hydride or calcium hydride or anhydrous calcium sulphate, but advantageously a reactive water-scavenger is used, for example, an inorganic salt such as, for example, magnesium sulphate (followed by filtration) or a mono- or di-functional silane, for instance, ethoxytrimethyl silane.

A coating composition comprising polymer (B) may include one or more unreactive oils such as, for example, a silicone oil, especially a methylphenyl silicone oil such as that sold by Rhone-Poulenc under the trademark "Rhodorsil Huile 550" or a petroleum or polyolefin oil or a polyaromatic oil. A preferred example is petrolatum oil.

The proportion of unreactive oil(s) may be in the range of from 5 to 25% by weight, based on the amount of component (B), preferably up to 10% by weight.

The initial coating may be a clear, transparent material or may be pigmented or dyed, provided that any pigment or dye used does not detract unduly from the desired latency (as a result, for example, of high moisture content or surface acidity or basicity). The pigment volume concentration in the coating formulation may typically be in the range of from 0.5 to 25%. Particular mention may be made, for instance, of the use of metallic flake materials (for example, aluminium flake) or other so-called barrier pigments; also anti-corrosive pigments.

The curable polysiloxane or other material (B) may likewise be clear, pigmented or dyed, and either or both layers may incorporate other excipients and/or fillers such as barium sulphate or other mineral fillers, pyrogenic silica, bentonite or other clays.

Depending on reactivities, a coating formulation comprising the curable polysiloxane(s) can in principle be packaged in a one-, two or three-pack system. The initial coating formulation can be applied simply and easily as a one-pack system.

The thickness of the initial coating layer when dry may be in the range of from 50 to 100 microns, and the thickness of the layer comprising cured polysiloxane may be in the same range. More than one of each layer may be applied if desired.

The substrate can be any material that is to be used in a fouling, especially aquatic, environment. Thus, for example, the substrate may be metal, for instance, steel or aluminium; wood; concrete; a fibre-reinforced resin such as, for instance, a polyester resin; or another plastics material. A known anti-corrosive coating (such as, for instance, an epoxy, vinyl or alkyd coating) may be applied to the substrate before application of the initial coating formulation.

The initial layer applied in accordance with the invention can be formulated as a combined tie-coat and sealer.

A particular advantage of the invention is that the initial coating can be applied successfully over a range of worn or damaged anti-fouling coatings, especially if suitable barrier or anti-corrosive pigments are used, thereby avoiding a time-consuming and (in the case of toxic anti-fouling materials) potentially hazardous operation. In general, the only surface preparation needed before application of an initial coating according to the invention is a high-pressure fresh water wash.

Examples of anti-fouling coatings to which an initial coating according to the invention can be applied include self-polishing tin copolymers, rosin Laroflex and rosin acrylic. Low surface-energy systems such as silicones and fluoropolymers do not provide a sound base on which to apply an initial coating according to the invention.

Further important advantages are that the sequential application of layers according to the process of the invention is a simpler, more flexible and more controllable procedure than is offered by complex systems designed to produce outer siloxane-rich regions (such as WO 93/13179).

By appropriate selection of various parameters as described herein, especially the nature and content of the functional groups providing latent reactivity, the initial layer composition in the process of the invention can be designed to permit a relatively long time interval between the application of the separate layers.

The following Examples illustrate the process of the invention:

EXAMPLE 1

A glass-reinforced plastics (GRP) substrate bearing a coating of aged anti-fouling material (self-polishing tin copolymer, rosin Laroflex or rosin acrylic) is cleaned by high-pressure washing and allowed to dry.

A first coating formulation is applied to the washed substrate by brushing and roller-coating and allowed to dry to give an initial layer of average thickness 75 microns having latent reactivity by virtue of unreacted functional groups derived from the coating formulation.

Before exhaustion of the latency period provided by the unreacted functional groups, a second coating formulation, comprising a curable organopolysiloxane or a curable fluorinated acrylic polymer, is applied to the initial layer and cured to give an adherent anti-fouling layer of average thickness 75 microns.

The composition of the first coating formulation is as follows:

|   | Parts by weight: |
|---|---|
| Acrylic polymer A | 54.7 |
| Xylene | 7.5 |
| Bentone | 2.9 |
| Talc | 16.7 |
| Black iron oxide | 2.9 |
| Aluminium flake | 13.0 |
| Methyl isobutyl ketone | 2.3 |

The latency period provided by the initial layer formed from this composition is determined in a preliminary experiment, in which test portions of the curable organopolysiloxane composition are applied at a series of different time intervals to different test areas of the initial layer. The latency period is taken to be the maximum time interval, under the prevailing conditions of temperature and humidity (after application of the initial layer) at which satisfactory adhesion of the polysiloxane coating is still achieved.

EXAMPLES 2–8

The process of Example 1 is repeated using the different initial coating compositions set out below. The same GRP substrate is used except where indicated.

|   | Parts by weight |
|---|---|
| Example 2: | |
| Acrylic polymer A | 67.0 |
| Xylene | 10.1 |
| Bentone | 1.6 |
| Talc | 9.3 |
| Black iron oxide | 1.6 |
| Aluminium flake | 7.2 |
| Methyl isobutyl ketone | 3.2 |

-continued

| | Parts by weight |
|---|---|
| Example 3: | |
| Acrylic polymer A | 91.5 |
| Xylene | 8.5 |
| Substrate: | |
| gel-coated GRP (no previous anti-fouling treatment), primed with an epoxy anti-corrosive composition. | |
| Example 4: | |
| Acrylic polymer A | 54.7 |
| Xylene | 7.5 |
| Bentone | 2.9 |
| Talc | 16.7 |
| Black iron oxide | 2.9 |
| Aluminium flake | 13.0 |
| Methyl isobutyl ketone | 2.3 |
| Example 5: | |
| Acrylic polymer B | 67.0 |
| Xylene | 10.1 |
| Bentone | 1.6 |
| Talc | 9.3 |
| Black iron oxide | 1.6 |
| Aluminium flake | 7.2 |
| Methyl isobutyl ketone | 3.2 |
| Example 6: | |
| Acrylic polymer B | 91.5 |
| Xylene | 8.5 |
| Substrate: | |
| wood (no previous anti-fouling treatment), primed with an anti-fouling primer. | |
| Example 7: | |
| Epikote 1001 Adduct | 54.7 |
| Xylene | 7.5 |
| Bentone | 2.9 |
| Talc | 16.7 |
| Black iron oxide | 2.9 |
| Aluminium flake | 13.0 |
| Methyl isobutyl ketone | 2.3 |
| Example 8: | |
| Epikote 1001 Adduct | 91.5 |
| Xylene | 8.5 |
| Substrate: | |
| bare concrete (no previous anti-fouling treatment), primed with an epoxy anti-corrosive composition. | |

The acrylic polymer A used in the Examples is derived from the following monomers:

| | Parts by weight: |
|---|---|
| Methoxyethylacrylate | 306.6 |
| Methylmethacrylate | 715.3 |
| Trimethoxysilylpropylmethacrylate | 283.2 |
| Mercaptopropyltrimethoxy silane | 56.0 |

The acrylic polymer A is prepared as follows:

Trimethylbenzenes (540.0 g) are added to a 3 liter flange-topped reaction vessel, fitted with mechanical stirrer, temperature probe, water condenser and feed inlet. A monomer feed is prepared, made up from monomers and radical initiator Azobis(isobutyronitrile) (AIBN, 23.4 g). The reaction vessel is heated to 100° C. under a slow stream of nitrogen and the feed added over a 3 hour period. During the addition, the temperature is maintained at 100° C. using a temperature control unit. Upon completion of the monomer feed, the solution is maintained at 100° C. for 30 minutes after which time a boost of AIBN (7.8 g) in trimethylbenzenes (30 g) is added in one shot. After stirring the solution at 100° C. for 45 minutes, a second identical boost is added and the solution stirred for a further 1 hour before being allowed to cool.

| % Solids (Theor.) = | 70% |
|---|---|
| Tg (Theor.) = | 39.1° C. |
| Molecular Weight (Mn) ~ | 3000 |

The acrylic polymer B used in the Examples is derived from the following monomers:

| | Parts by weight: |
|---|---|
| Butylacrylate | 198.2 |
| Methylmethacrylate | 757.0 |
| Triisopropoxysilylpropylmethacrylate | 393.1 |

The acrylic polymer B is prepared analogously to acrylic polymer A, and has Tg (Theor.)=36.7° C. and molecular weight (Mn)~10 000.

The epoxy adduct I used in the Examples is obtained from 966.2 parts by weight of Epikote 1001 (a condensation product of bisphenol A and epichlorohydrin) and 33.8 parts by weight of mercaptopropyltrimethoxysilane. The adduct is prepared by the following procedure: Ethanol (1000.0 g) and Epikote 1001 are added via a wide neck funnel to a 3 liter flange-topped reaction vessel, fitted with mechanical stirrer, temperature probe and water condenser. A white emulsion is formed on stirring and heating to reflux (ca. 78° C.). Mercaptopropyltrimethoxy silane is then added drop-wise via a peristaltic pump over a period of 4 hours. After addition of the silane, the reaction is allowed to proceed at reflux for a further 1 hour, or until the reaction is complete as determined by $^{13}$C NMR.

The solution is allowed to cool to ca. 50° C. and CB30 (428.0 g) is added. The flask is fitted with still head and distillation take-off apparatus, and all the low boiling solvent (ethanol:methanol ca 85.15) removed at low temperature (still head ca. 40° C.) under reduced pressure (ca. 600 mmHg).

| % Solids (Theor.) = | 70% |
|---|---|
| Tg (Theor.) = | 38.9° C. |

An alternative epoxy adduct II may be obtained analogously from 900.0 parts by weight of Epikote 1004 (a condensation product of bisphenol A and epichlorhydrin) and 100.0 parts by weight of mercaptopropyl-dimethoxymethyl silane.

| | |
|---|---|
| % Solids (Theor.) = | 60% |
| Tg (Theor.) = | 61.9° C. |

The latency period provided by acrylic polymer A and the epoxy adduct I is up to 7 days; the latency period provided by acrylic polymer B and the epoxy adduct II is up to 2 weeks.

Coating formulations for forming the second coating in the examples are as follows:

| | Parts by weight |
|---|---|
| a) One-pack formulation | |
| α, ω-hydroxy functional dimethyl siloxane (viscosity 35 poise) | 55.00 |
| Methyltrimethoxy silane | 2.50 |
| Airflow silica (Aerosil) | 2.20 |
| Titanium ethylacetoacetonate | 1.00 |
| Trimethylbenzenes | 29.40 |
| b) Two-pack formulation | |
| Base | |
| α, ω-hydroxy functional dimethyl siloxane (viscosity 35 poise) | 100.00 |
| Air floated silica (Aerosil) | 8.00 |
| Methyltris(methylethylketoxime) silane | 6.00 |
| Catalyst Solution | |
| Trimethylbenzenes | 15.00 |
| Dibutyltindilaurate | 0.08 |
| c) Two-pack formulation | |
| Base | |
| Fluorinated acrylic polymer C | 70.00 |
| Trimethylbenzenes | 30.00 |
| Catalyst Solution | |
| Trimethylbenzenes | 15.00 |
| Dibutyltindilaurate | 0.08 |

The fluorinated acrylic polymer C is derived from following monomers:

| | Parts by weight |
|---|---|
| Butylacrylate | 57.10 |
| Methylmethylmethacrylate | 92.9 |
| Trimethoxysilylpropylmethacrylate | 32.10 |
| Pentafluoropropylmethacrylate | 19.40 |

The fluorinated acrylic polymer C is prepared analogously to acrylic polymer a, except that there is no chain transfer agent and the quantity of trimethyl benzenes is 90.00 parts by weight, the quantity of the radical initiator AIBN is 5.10 parts by weight in the main monomer feed and 1.70 parts by weight in each boost.

| | |
|---|---|
| % Solids (Theor.) = | 70% |
| Molecular weight (Mn) = | 8000 |

| d) Three-pack formulation | Parts by weight |
|---|---|
| Base | |
| α, ω-hydroxy functional dimethyl siloxane (viscosity 35 poise) | 56.00 |
| Air floated silica (Aerosil) | 1.70 |
| Silicone oil (Rhodorsil RP550) | 4.10 |
| Trimethylbenzenes | 11.10 |
| Curing agent | |
| Tetraethylorthosilicate | 2.60 |
| Silicone oil (Rhodorsil RP550) | 0.80 |
| Trimethylbenzenes | 8.50 |
| Catalyst Solution | |
| Dibutyltindilaurate | 0.55 |
| Trimethylbenzenes | 14.20 |

What is claimed is:

1. A process for inhibiting the fouling of a substrate in a fouling environment, which comprises forming on the substrate, before exposure to the environment, a coating comprising a single film-forming polymer, the film-forming polymer consisting essentially of film-forming polymer (A) carrying unreacted curable silicon-containing functional groups providing latent reactivity, and thereafter applying a layer comprising a curable polymeric fouling-inhibiting material (B) and bonding the applied layer to the coating by a condensation curing reaction involving the unreacted functional groups thereon.

2. A process according to claim 1, wherein the curable silicon-containing functional groups of (A) are pendant functional groups.

3. A process according to claim 1, wherein the silicon-containing functional groups are curable by virtue of one or more curable functional groups selected from the group consisting of aliphatic, aromatic and araliphatic ether and oxime groups, which groups may be substituted or unsubstituted.

4. A process according to claim 1, wherein the curable silicon-containing functional groups are groups of the formula —Si($R_1$)($R_2$)($R_3$)

in which the groups represented by $R_1$, $R_2$, and $R_3$ may be the same or different and each may comprise an ether or ester group, and in which one or two of $R_1$ to $R_3$ may represent hydrogen or a hydrocarbon group.

5. A process according to claim 4, wherein the ether or ester group includes a straight-chain or branched alkyl moiety having from 1 to 4 carbon atoms, and in which the hydrocarbon group is a straight-chain or branched alkyl group having from 1 to 4 carbon atoms.

6. A process according to claim 1, wherein the silicon-containing functional groups are curable by virtue of one or more oxime groups of the formula

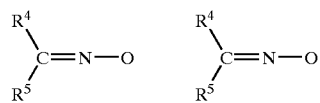

in which $R^4$ and $R^5$ may be the same or different and each represents a straight-chain or branched, saturated or unsaturated, aliphatic hydrocarbon radical; an aromatic group; or an araliphatic group; or $R^4$ and $R^5$ together represent an alkylene group; or one of $R^4$ and $R^5$ represents hydrogen.

7. The process according to claim 6, wherein the straight-chain or branched, saturated or unsaturated, aliphatic hydrocarbon radical has up to 7 carbon atoms; the aromatic group is a phenyl group; and the araliphatic group is a benzyl group.

8. The process according to claim 6, wherein the straight-chain or branched, saturated or unsaturated, aliphatic hydrocarbon radical has up to 4 carbon atoms; the aromatic group is a phenyl group; and the araliphatic group is a benzyl group.

9. The process according to claim 6, wherein the straight-chain or branched, saturated or unsaturated, aliphatic hydrocarbon radical is a methyl or ethyl group; the aromatic group is a phenyl group; and the araliphatic group is a benzyl group.

10. A process according to claim 1, wherein the curable silicon-containing functional groups are trimethoxy silyl or methyl dimethoxysilyl groups.

11. A process according to claim 1, wherein the polymer (A) has no silanol or amine functionality.

12. A process according to claim 1, wherein the polymer (A) carries no functional groups other than the curable silicon-containing functional groups conferring latent reactivity.

13. A process according to claim 1, wherein at least 55% of the repeating units in the film-forming polymer (A) are other than siloxane repeating units.

14. A process according to claim 13, wherein the proportion of siloxane repeating units in the film-forming polymer (A) is not more than 25%.

15. A process according to claim 14, wherein the proportion of siloxane repeating units in the film-forming polymer (A) is not more than 10%.

16. A process according to claim 14, wherein the proportion of siloxane repeating units in the film-forming polymer (A) is not more than 5%.

17. A process according to claim 1, wherein the polymer (A) is substantially free from siloxane repeating units.

18. A process according to claim 1, wherein the polymer (A) is derived from one or more monomers (A1) which carry curable silicon-containing functional groups and one or more monomers (A2) which do not carry such groups.

19. A process according to claim 1, wherein the polymer (A) is derived from one or more ethylenically unsaturated monomers.

20. A process according to claim 1, wherein the Tg of the polymer (A) is above ambient temperature.

21. A process according to claim 1, wherein the polymer (A) has a number-average molecular weight in the range of from 3,000 to 10,000.

22. A process according to claim 1, wherein the unreacted curable silicon-containing functional groups provide a period of latent reactivity of 48 hours or more.

23. A process according to claim 1, wherein the fouling-inhibiting material (B) is curable by virtue of silanol or silicon-alkoxy groups.

24. A process according to claim 1, wherein the fouling-inhibiting material (B) is curable by virtue of curable functional groups selected from the group consisting of aliphatic, aromatic and araliphatic ether, ester and oxime groups, trialkoxysilyl or hydrosilyl groups.

25. A process according to claim 1, wherein the fouling-inhibiting material (B) is a linear polymer.

26. A process according to claim 1, wherein the fouling-inhibiting material comprises a curable polysiloxane.

27. A process according to claim 26, wherein the polysiloxane (B) has the structure $R^3O(SiR^1R^2O)_nR^3$, in which $R^1$ and $R^2$, which may be the same or different on each silicon atom and on different silicon atoms in the polymer, each represents an alkyl group; an alkenyl group; a cycloalkyl or cycloalkenyl group; an aryl group; or a halgenated or cyano-substituted hydrocarbon group, with the proviso that one of $R^1$ and $R^2$ may represent hydrogen on some or all of the silicon atoms and that $R^1$ and $R^2$ may each represent hydrogen on some of the silicon atoms, $OR^3$ represents a curable functional group in which $R^3$ represents a monovalent radical; and n represents a degree of polymerisation.

28. A process according to claim 1, wherein the fouling-inhibiting material comprises a curable fluorine-containing polymer.

29. A process according to claim 28, wherein the fluorine-containing polymer comprises a fluoro-acrylate polymer.

30. A process according to claim 1, wherein the fouling-inhibiting material (B) has a number-average molecular weight in the range of from 5,000 to 85,000.

31. A process according to claim 1, wherein the fouling-inhibiting material (B) is applied in admixture or conjunction with a catalyst for the condensation curing reaction.

32. A process according to claim 1, wherein the fouling-inhibiting material (B) is applied in admixture or conjunction with a cross-linking agent for the condensation curing reaction.

33. A process according to claim 1, wherein the substrate has a worn or damaged anti-fouling coating thereon.

34. A process according to claim 1, wherein the fouling environment is an aquatic environment.

35. A process according to claim 34, wherein the fouling environment is a marine environment.

36. A process according to claim 1, wherein the silicon-containing functional groups are curable by virtue of one or more oxime groups of the formula

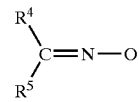

in which $R^4$ and $R^5$ may be the same or different and each represents a straight-chain or branched, saturated or unsaturated, aliphatic hydrocarbon radical.

* * * * *

UNITED STATES PATENT AND TRADEMARK OFFICE
CERTIFICATE OF CORRECTION

PATENT NO. : 6,723,376 B1
DATED : April 20, 2004
INVENTOR(S) : Hamilton et al.

It is certified that error appears in the above-identified patent and that said Letters Patent is hereby corrected as shown below:

Title page,
Item [75], Inventors, "Gergina Elizabth Green," should read -- Georgina Elizabeth Green, --

Column 18,
Lines 56-60, the formula

"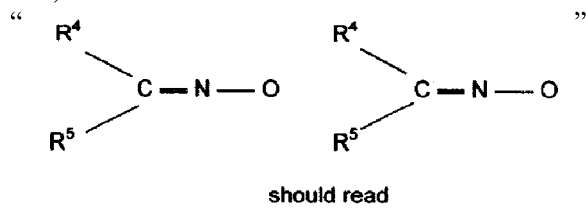"

should read

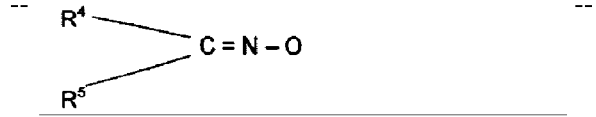

Column 20,
Line 11, the formula "$R^3O(SiR^1R^2O)_nR^3$," should read -- $R^3O(SiR^1R^2O)_nR^3$, --

Signed and Sealed this

Fifth Day of July, 2005

JON W. DUDAS
*Director of the United States Patent and Trademark Office*